United States Patent [19]

Wandler et al.

[11] Patent Number: 5,021,915

[45] Date of Patent: Jun. 4, 1991

[54] COMBINATION STARTER-PROTECTOR DEVICE AND METHOD OF ASSEMBLING SAME, OVERLOAD PROTECTOR AND METHOD OF ASSEMBLING SAME

[75] Inventors: Richard A. Wandler, Clinton, Iowa; Kenneth R. Renkes, Fenton, Ill.

[73] Assignee: General Electric Company, Fort Wayne, Ind.

[21] Appl. No.: 422,600

[22] Filed: Oct. 17, 1989

[51] Int. Cl.[5] .................... H02H 7/08

[52] U.S. Cl. .................... 361/26; 361/32; 318/783

[58] Field of Search .................... 361/23-26, 361/32, 34; 318/783, 788

[56] References Cited

U.S. PATENT DOCUMENTS

| | | | |
|---|---|---|---|
| Re. 31,367 | 8/1983 | D'Entremont | 361/27 |
| 3,988,709 | 10/1976 | McKinnon et al. | 338/57 |
| 4,037,316 | 7/1977 | Stoll | 29/622 |
| 4,084,202 | 4/1978 | Stoll | 361/24 |
| 4,237,510 | 12/1980 | Thompson, Jr. et al. | 361/24 |
| 4,319,299 | 3/1982 | Woods et al. | 361/24 |
| 4,334,162 | 6/1982 | Haag et al. | 310/68 |
| 4,387,412 | 6/1983 | Woods et al. | 361/27 |
| 4,422,120 | 12/1983 | Kobayashi et al. | 361/24 |
| 4,467,385 | 8/1984 | Bandoli et al. | 361/24 |
| 4,689,595 | 8/1987 | Jorgensen | 337/107 |
| 4,706,152 | 11/1987 | DeFilippis et al. | 361/32 |
| 4,713,717 | 12/1987 | Pejouhy et al. | 361/26 |

*Primary Examiner*—Todd E. DeBoer
*Attorney, Agent, or Firm*—Ralph E. Krisher, Jr.

[57] ABSTRACT

A method of assembling an overload protector for use in a combination starter-protector device adapted to be associated in circuit relation with a dynamoelectic machine. To practice this method, a conductive member is extended through a slot in a sidewall of a casing, and a contact section of the conductive member is located within an open ended recess in the casing defined by the sidewall and a base wall while a terminal section of the conductive member is located on an extension wall extending laterally of the sidewall. The terminal section is secured against displacement to the extension wall. A support for a bimetal switch element is disposed in an assembly position within the open ended recess, and the bimetal switch element is biased into engagement in circuit relation with the contact section.

An overload protector, a combination starter-protector device and a method of assembling a starter-protector device are also disclosed.

36 Claims, 4 Drawing Sheets

COMBINATION STARTER-PROTECTOR DEVICE AND METHOD OF ASSEMBLING SAME, OVERLOAD PROTECTOR AND METHOD OF ASSEMBLING SAME

FIELD OF THE INVENTION

This invention relates in general to electrical controls and in particular to a combination starter-protector device adapted for connection in circuit relation with a dynamoelectric machine, a method of assembling a combination starter-protector device, an overload protector for use in a combination starter-protector device, and a method of assembling an overload protector.

BACKGROUND OF THE INVENTION

In the past various different combination starter-protector devices and overload protectors for use in such devices have been utilized in circuit relation with a winding circuit of a dynamoelectric machine, such as for instance an electric motor. At least some of the past combination starter-protector devices utilized a positive temperature coefficient resistor (hereinafter sometimes referred to as a PTCR) which was operable generally to at least impede current flow to a start or auxiliary winding means of the electric motor generally as the electric motor was energized to its preselected running or synchronous speed. In some of the aforementioned combination starter-protector devices, an overload or overload protector was thermally coupled with the PTCR and subjected to the current in at least a run or main winding means of the electric motor. Of course, the overload was operable to interrupt the current flow to the electric motor in the event of the occurrence of a winding circuit overload condition which may have had a deleterious affect on components of the electric motor, such as for instance burning-out of the winding circuit. It is believed that in others of the past combination starter-protector devices, the overload may not have been thermally coupled with the PTCR.

U.S. Pat. No. 4,319,299 issued Mar. 9, 1982 to Lee O. Woods and Donald L. Haag, U.S. Pat. No. 4,131,871 issued Dec. 26, 1978 to Lee O. Woods and Donald L. Haag, U.S. Pat. No. 4,084,202 issued Apr. 11, 1978 to Donald H. Stoll, U.S. Pat. No. 4,042,860 issued Aug. 16, 1977 to Lee O. Woods and James P. Frank, and U.S. Pat. No. 4,037,316 issued July 26, 1977 to Donald H. Stoll illustrate some of the above discussed past combination starter-protector devices, as well as the operations thereof, in circuit relation with a winding circuit of an electric motor.

The past combination starter-protector devices were associated in various manners with various types of electric motors and other apparatus, such as for instance air conditioners or refrigerators having compressor units or the like which utilized hermetic electric motors. In many of these compressor units, a Fusite plug or the like was mounted through a housing or jacket of such compressor units, and such Fusite plug contained a plurality of male terminals connected internally of the compressor housing with the winding circuit of the hermetic electric motor. At least some of the past combination starter-protector devices, such as for instance those illustrated in the aforementioned patents, were associated in electrical mounting or plug-on engagement with the male terminals of the Fusite plug exteriorly of the compressor housing. Of course, some of the past starter devices were of both the plug-on and plug-in type, as illustrated in U.S. Pat. Nos. 3,921,117 and 3,955,170, respectively. In some other installations, it is believed that at least the starter device was electrically interconnected by a plurality of leads having quick-connect terminals which were associated with electric motor terminals so as to be "hung" therefrom.

SUMMARY OF THE INVENTION

In general, a combination starter-protector device in one form of the invention and adopted for connection in circuit relation with a dynamoelectric machine has a casing with a plurality of wall means for defining a set of chambers and a channel in said casing with the channel communicating with one of the chambers. A set of first terminal openings is provided in one wall means, and two of the first terminal openings intersect another of the chamber chamber while another first terminal opening intersects the channel. Sets of second and third terminal openings are provided in another of the wall means, the second terminal openings intersecting with the another chamber, one third terminal opening intersecting one second terminal opening, and another third terminal opening intersecting the one wall means adjacent a third one of the wall means. A PTCR having a pair of opposite contact surfaces is disposed in the another chamber, and a pair of means is provided for supporting the PTCR in the another chamber. Each supporting means includes means for engagement in circuit relation with a respective one opposite contact surface and a set of resilient means engaged with the casing for urging the respective one engagement means into the circuit relation with the respective one opposite contact surface, respectively. A set of first female terminals is provided on each supporting means with one first female terminal on each supporting means being respectively disposed in the second terminal openings and another first female terminal on each supporting means being respectively aligned with one of the two first terminal openings and the third first terminal opening, and a first male terminal extending from the one first female terminal on one supporting means is received in the one third terminal opening. An overload protector disposed in a third chamber includes a conductive support seated against the casing in the third chamber, a third male terminal on the support extending through the third wall means and received in the another third terminal opening, and conductive means for extension through the third wall means between the one and third chambers. Means disposed in both the channel and one chamber for connection in circuit relation with the conductive means includes a third female terminal aligned with the other of the two first terminal openings.

Also in general and in one form of the invention, a method is provided for assembling an overload protector for use in a starter-protector device adapted to be associated in circuit relation with a dynamoelectric machine. The overload protector has a casing, a conductive support with a bimetal switch element secured thereto, and a conductive member having a contact section and a terminal section. The casing includes a sidewall and a base wall defining an open ended recess, at least one slot in the sidewall intersecting the casing, and an extension wall extending from the sidewall therebeyond. In practicing the method, the conductive member is extended through the at least one slot, and the contact section is located within the open ended recess at least adjacent the base wall while the terminal section is located on the extension wall. The terminal section is secured to the extension wall against displacement. The support is disposed in an assembly position at least in part within the open ended recess, and the bimetal switch element is engaged in circuit relation with the contact section.

Further in general and in one form of the invention, a method is provided for assembling a combination starter-protector device adapted to be associated in circuit relation with a dynamoelectric machine. The device has a connection strap defining a pair of female terminals, a conductive member having a contact section and a terminal section, a terminal post, an overload protector, and a set of casing members. The overload protector includes a conductive support with a bimetal switch element pivotally mounted thereto. One casing member includes a sidewall and a base wall defining an open ended recess, and an extension wall extending generally laterally beyond a part of the sidewall, and another extension wall on another casing member extending therebeyond. In practicing this method, the contact section of the conductive member is located within the open ended recess in the casing member, and the terminal section of the conductive member is located on the first named extension wall. The terminal post is interconnected with the first named extension wall and the terminal section, and at least the terminal section is retained against displacement. The conductive support is mounted at least in part within the open ended recess against displacement therefrom, and the bimetal switch element is biased into contacting engagement in circuit relation with the contact section. After one female terminal on the connecting strap is received in circuit relation on the terminal post, the one casing member and a third casing member are arranged at least adjacent each other in assembly positions, respectively, and the connection strap is pivoted about the terminal post to place the other female terminal on the connecting strap in a preselected position on the third casing member. The another casing member is placed in an assembly position in overlaying engagement with the third casing member, and the another extension wall is positioned at least adjacent the sidewall and at least in part in overlaying engagement with the first named extension wall. The one aperture in the another casing is aligned with the other female terminal in its preselected position, and the connection strap is enclosed within the casing members when in the assembly positions thereof. Thereafter, when in their assembly positions, the casing members are secured against displacement from each other.

Still further in general and in one form of the invention, an overload protector is provided for use in a combination starter-protector device adapted to be associated in circuit relation with a dynamoelectric machine. The overload protector has a casing including a sidewall and a base wall defining an open ended recess in the casing, at least one slot in the sidewall intersecting the open ended recess, and another wall extending beyond the sidewall exteriorly of the open ended recess. A conductive member extending through the at least one slot has a contact section disposed in the open ended recess at least adjacent the base wall and a terminal section seated at least in part on the another wall. Means is provided for securing the terminal section against displacement from the another wall, and bimetal switch means disposed within the open ended recess is operable generally for switching between one position engaged in circuit relation with the contact section and another position displaced from the contact section. Conductive means is disposed at least in part within the open ended recess for supporting the bimetal switch means.

BRIEF DESCRIPTION OF THE DRAWINGS

FIGS. 1 and 4 are sectional views taken along lines 3—3 and 4—4 in FIG. 2, respectively;

Corresponding reference characters indicate corresponding parts throughout the several views of the drawings.

The exemplifications set out herein illustrate the preferred embodiments of the invention in one form thereof, and such exemplifications are not to be construed as limiting in any manner either the scope of the disclosure or the scope of the claims which follow.

DETAILED DESCRIPTION OF THE PREFERRED EMBODIMENT

Figure 1:
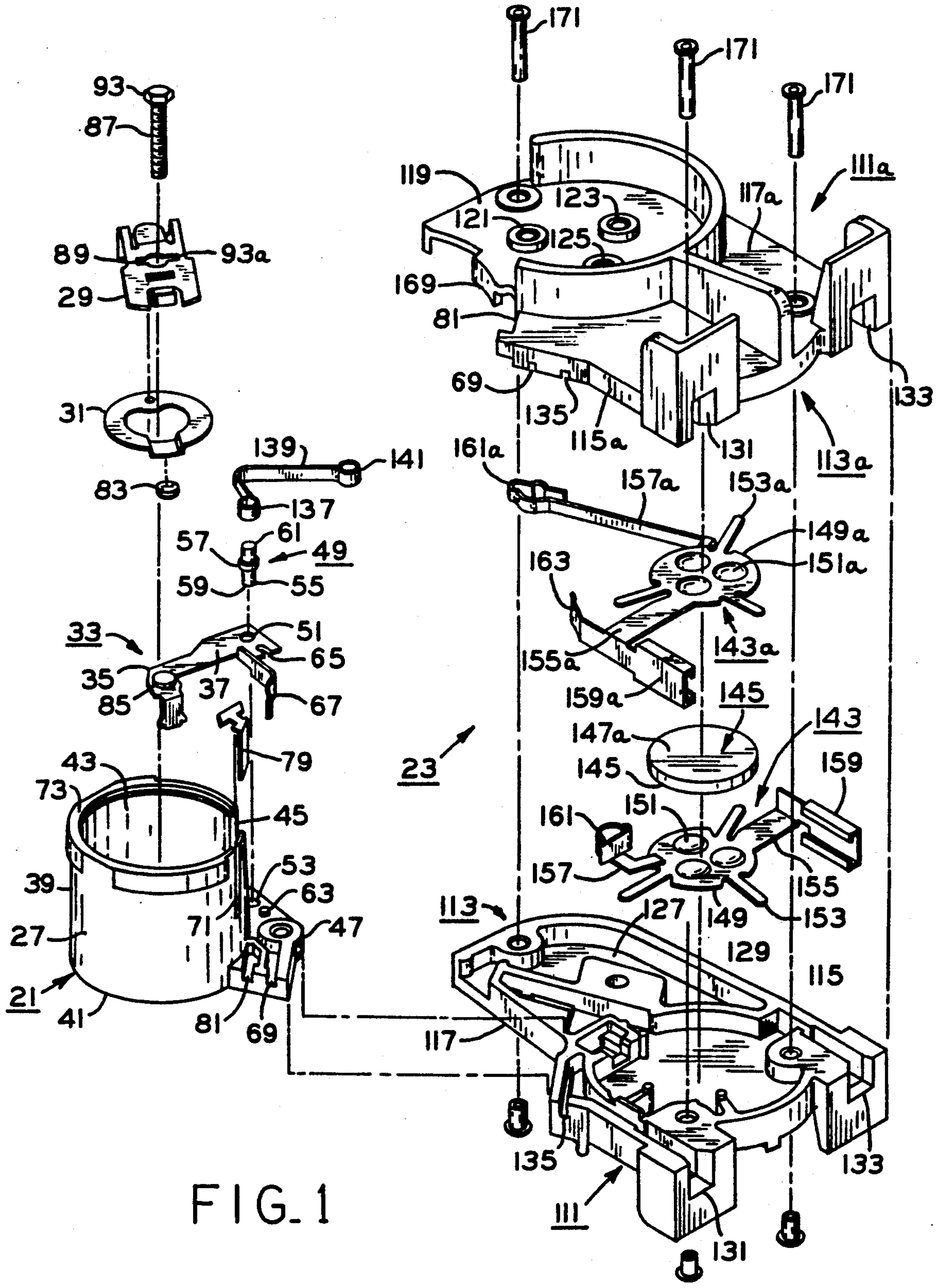
FIG. 1 is an exploded perspective view showing a combination starter-protector device and an overload protector respectively in one form of the invention and illustrating principles which may be practiced in respective methods of assembling such device and such overload protector also in one form of the invention.
Figure 2:
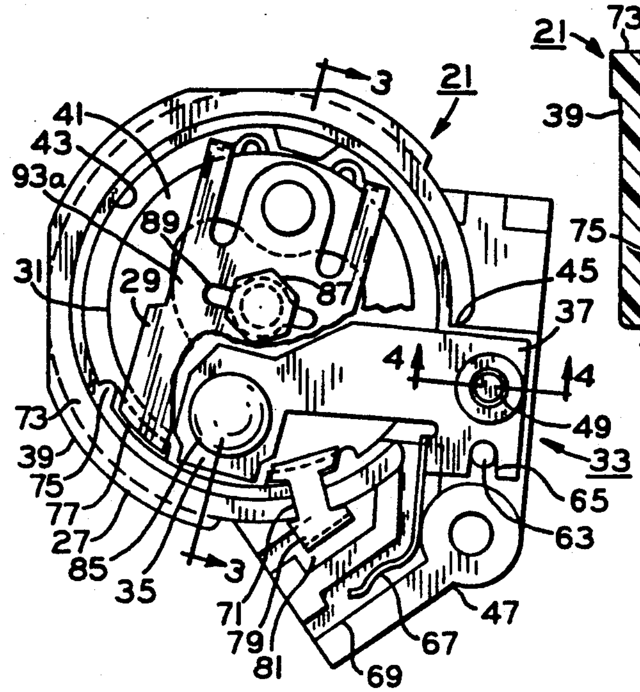
FIG. 2 is a top elevational of the overload protector of FIG. 1, with parts thereof broken away.
Figure 3:
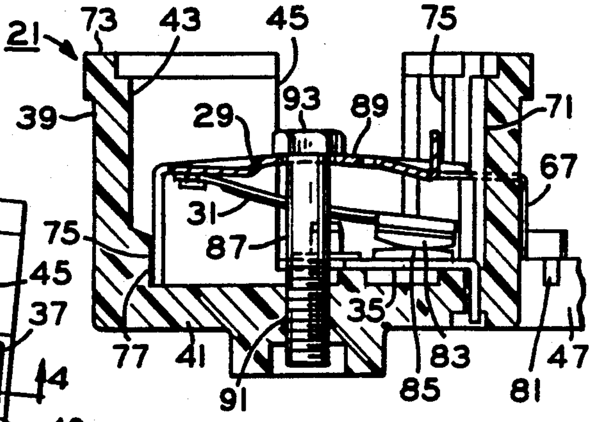
Figure 4:
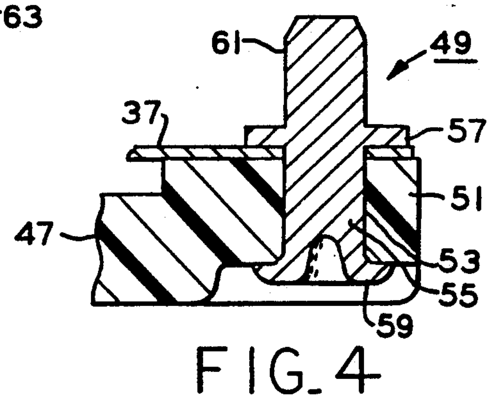

Referring now to the drawings in general, there is illustrated in one form of the invention a method of assembling an overload or overload protector 21 for use in a combination starter-protector device 23 adapted to be associated or connected in circuit relation with a dynamoelectric machine, such as for instance a hermetic electric motor 25 or the like (FIGS. 1–6 and 11). Overload 21 is provided with a casing or casing member 27 which may be formed of a dielectric material, such as a resin or the like for instance, a conductive support or supporting means 29 with a bimetal switch element or switch means 31 secured thereto, and a conductive member 33 having a contact section 35 and a terminal or mounting section 37 (FIGS. 1-3). Casing 27 includes a sidewall 39 and a base wall 41 defining an open ended recess 43 in the casing, a slot 45 in the sidewall intersecting with the open ended recess, and an extension wall 47 extending from the sidewall exteriorly of the open ended recess (FIGS. 1 and 2). In the practice of this method, conductive member 33 is extended or passed through slot 45, and contact section 35 of the conductive member is located within open ended recess 43 in casing 27 at least adjacent base wall 41 while terminal section 37 of the conductive member is located or seated in abutment on extension wall 47 (FIGS. 1 and 2). Upon the location of terminal section 37, it is secured against displacement to extension wall 47 by suitable means, such as for instance a terminal post 49 or the like (FIG. 4). Thereafter, conductive support 29 is disposed or positioned at least in part within open ended recess 43, and bimetal switch element 31 on the support is engaged in circuit relation with contact section 35 of conductive member 33 (FIGS. 1 and 3).

More particularly and with specific reference to FIGS. 1–4, a pair of mounting openings or apertures 51, 53 are provided through terminal section 37 of conductive member 33 and extension wall 47 of casing 27, respectively. During the aforementioned location of terminal section 37 on extension wall 47, mounting opening 51 in the terminal section and mounting opening 53 in the extension wall are aligned with each other, as shown in FIG. 4. When mounting openings 51, 53 are so aligned with each other, a mounting end or end portion 55 on terminal post 49 is passed or extended through the aligned mounting openings to seat a flange 57 on the terminal post generally about mounting opening 51 of the terminal section in circuit relation therewith. Upon the seating of terminal post flange 57 against terminal section 37 of conductive member 33, a distal end 59 on mounting end portion 55 of terminal post 49 is swedged or otherwise deformed into displacement preventing engagement with extension wall 47 generally about mounting opening 53 therein. Thus, the above disclosed engagement of deformed distal end 59 of terminal post 49 with extension wall 47 and terminal post flange 57 with terminal section 37 of conductive member 33 not only retains the terminal post in an assembly position against displacement from aligned mounting openings 51, 53 but also retains the conductive member at least in part in an assembly position on the extension wall against displacement therefrom. With terminal post 49 so mounted in its assembly position, a female terminal receiving end or end portion 61 of the terminal post extends generally opposite mounting end portion 55 and generally perpendicularly from terminal section 37 of conductive member 33. If desired, extension wall 47 of casing 27 may be provided with a locating or seating surface or abutment 63 to engage a cooperating marginal surface, such as for instance a notch 65 or the like, in terminal section 37 of conductive member 33 thereby to assist in the location of the conductive member in its assembly position, as discussed above and as best seen in FIG. 2. Furthermore, during the location of conductive member 33 in its assembly position on casing 27, a male terminal 67 integrally formed on terminal section 37 so as to extend therefrom is positioned or disposed in a terminal slot 69 at least partially provided therefor in extension wall 47.

Casing 27 is additionally provided with another slot 71 in sidewall 39 intersecting open ended recess 43 and spaced from slot 45, and both slots 45, 71 also intersect with a marginal edge 73 on the casing extending about the open ended recess, as best seen in FIG. 2. As best seen in FIGS. 2 and 3, a plurality of seating surfaces or abutments 75 are also provided on sidewall 39 extending into open ended recess 43 for positioning engagement with cooperating abutment parts 77 on conductive support 29 upon the assembly thereof with casing 29, as discussed hereafter.

When conductive support 29 is assembled with casing 27, the conductive support is passed or entered into open ended recess 43 past marginal edge 73 on the casing, and abutment parts 77 on the conductive support are seated in abutment with seating surfaces 75 on sidewall 39 within the open ended recess thereby to locate the conductive member in a preselected or assembly position within the open ended recess. To retain conductive support 39 against displacement from its assembly position within open ended recess 43, a hardenable adhesive material (not shown) is hardened in place between a part of the conductive support and sidewall 39 of casing 27. While conductive support 29 is disclosed as being retained against displacement from its assembly position in open ended recess 43 by a hardenable adhesive material, as discussed above, it is contemplated that as an alternative construction, a part of the conductive support could be staked in place to casing 29 within the scope of the invention; however, such alternative construction is not shown for the purposes of drawing simplification and brevity of disclosure.

A male or line terminal 79 is connected in circuit relation with conductive support 29 by suitable means, such as for instance a spot wild or the like (not shown), and during the entrance of the conductive support into its assembly position in open ended recess 43, the male terminal is passed or extended through slot 71 in sidewall 39 of casing 29 to be received or positioned in another terminal opening or slot 81 provided at least in part in extension wall 47 adjacent terminal opening 69, as best seen in FIGS. 1 and 2. Of course, terminal openings 69, 81 are isolated from each other.

Bimetal switch element 31 is heat sensitive and heated in response to current flow therethrough (as discussed in greater detail hereinafter) for discrete snap action movement between a stable configuration thereof, as well known to the art, and as best seen in FIG. 3, the bimetal switch element has a part thereof pivotally mounted or secured in circuit relation to conductive support 29 by suitable means, such as for instance a weld slug or the like. Since bimetal switch element 31 is mounted to conductive support 29, the bimetal switch element is conjointly entered with the conductive support into open ended recess 43, and when the conductive support is located in its assembly position within the open ended recess, as previously discussed, a movable contact 83 carried on the bimetal switch element is engaged or contacted in circuit relation with a stationary contact 85 on contact section 35 of conductive member 33. Thus, when movable and stationary contacts 83, 85 are in circuit making engagement, bimetal switch element 31 is disposed in its stable configuration and biased or resiliently stressed between conductive support 29 and contact section 35 of conductive member 33.

An adjusting screw 87 is passed or inserted through an aperture or opening 89 in conductive support into threaded or adjusting engagement with another aperture or opening 91 in base wall 41 of casing 29. A head 93 on adjusting screw 87 is urged into adjusting engagement with conductive support 29 generally about aperture 89 therein to exert an adjusting force onto the conductive support in response to the threaded engagement of the adjusting screw with base wall aperture 91. To complete the description of the method of assembling overload protector 21, conductive support 29 yields at least in part generally at a yieldable section 93*a* adjacent aperture 89 in the conductive support in response to the adjusting force exerted or applied thereon by adjusting screw 87, and in response to such yielding of the yieldable section, the adjusting force is transferred through the conductive support to bimetal switch element 31 adjusting its bias effecting the contacting engagement of movable and stationary contacts 83, 85.

With reference again to the drawings in general and recapitulating at least in part with respect to the foregoing, overload protector 21 in one form of the invention is illustrated for use in combination starter-protector device 23 adapted to be associated in circuit relation with dynamoelectric machine (FIGS. 1–6 and 11). Overload protector 21 is provided with casing 21 having sidewall 39 and base wall 41 defining open ended recess 43 in the casing (FIGS. 1 and 2). Slot 45 in sidewall 39 intersects open ended recess 43, and extension wall 47 of casing 21 extends beyond the sidewall exteriorly of the open ended recess (FIGS. 1 and 2). Conductive member 33 extends through slot 45 and includes contact section 35 disposed in open ended recess 43 at least adjacent base wall 41 and terminal section 37 seated at least in part on extension wall 47 (FIGS. 1–3). Means, such as for instance mounting end portion 55 and flange 57 of terminal post 49 or the like, is provided for securing terminal section 37 against displacement from extension wall 47 (FIG. 4). Bimetal switch means or element 31 disposed within open ended recess 43 is operable generally for switching between one position engaged in circuit relation with contact section 35 and another position displaced from the contact section (FIG. 3). Conductive means or support 29 is disposed at least in part within open ended recess 43 for supporting bimetal switch element 43 therein (FIGS. 2 and 3).

In the operation of overload protector 21 with is component parts in the above described positions thereof, assume that a current is passed through the overload protector from male or line terminal 79 to terminal post 49. Thus, the current passes from male terminal 79 through conductive support 29, bimetal switch element 31 and movable and stationary contacts 83, 85 in their circuit making engagement and therefrom through conductive member 33 to terminal post 49. As previously mentioned, bimetal switch element 31 is operable in response to heat generated by the current flowing therethrough. Therefore, in the event of the occurrence of a high resistance to the current flow, the value of the current is increased thereby to heat bimetal switch element 31 to a preselected temperature which effects the discrete snap action movement of the bimetal switch element from its at-rest position or stable configuration, i.e. when movable contact 83 is biased into circuit making engagement with stationary contact 85, into the actuated position or unstable configuration of the bimetal switch element thereby to displace or break the movable contact 83 from the stationary contact 85. Of course, when bimetal switch element 31 is so actuated to break movable contact 83 from engagement with stationary contact 85, the circuit through overload protector 21 between male terminal 79 and terminal post 49 is interrupted or broken. When the aforementioned high resistance to the current flow is alleviated, bimetal switch element 31 cools to a temperature less than the preselected temperature which effects the return discrete snap action movement of the bimetal switch element from its unstable configuration to its stable configuration. To complete the description of the operation of overload protector 21, movable contact 83 is reengaged with stationary contact 85 in response to the return discrete snap action movement of bimetal switch element 31 into its stable configuration thereby to reestablish the circuit through the overload protector between male terminal 79 and terminal posts 49.

Figure 5:
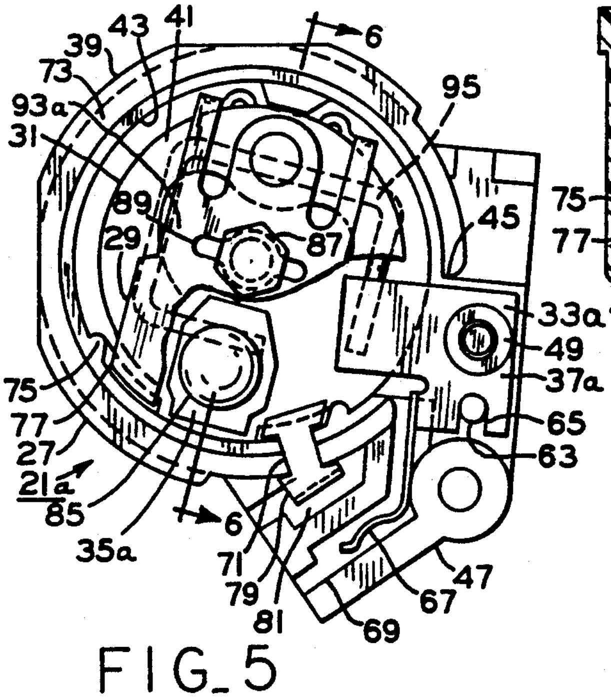
FIG. 5 is a partial top elevational view illustrating an alternative overload protector in one form of the invention with parts thereof removed for simplicity of disclosure.
Figure 6:
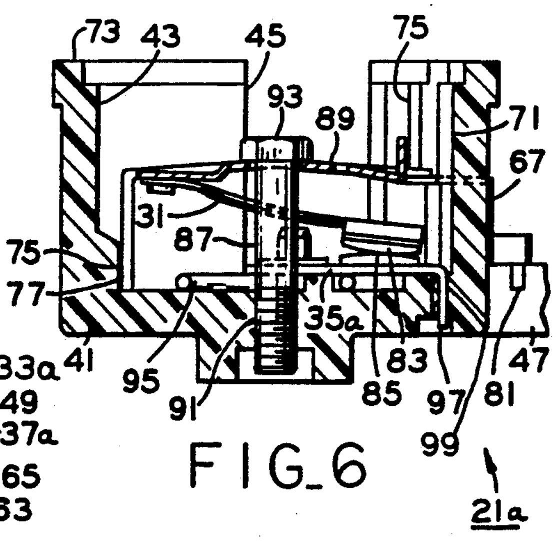
FIG. 6 is a partial sectional view taken along lines 6—6 in FIG. 5.

An alternative overload protector **21*a* and an alternative assembling method therefor are illustrated in FIGS. 5 and 6 in one form of the invention, respectively with the alternative overload protector and assembling method utilizing generally the same component parts functioning and assembled generally in the same manner as previously described with respect to overload protector 21 and its assembly method with the following exceptions. A conductive member 33*a* includes a contact section 35*a* and a terminal section 37*a*, and a resistance heating elements 95 is interconnected in circuit relation between terminal section 37*a* and a mounting or supporting terminal 97 for a stationary contact 85*a*** by suitable means, such as for instance welding or the like (not shown).

Subsequent to the aforementioned interconnection or assembly of contact section **35*a* with terminal section 37*a*, conductive member 33*a* is disposed in its assembly position on casing 35. In this assembly position, contact section 35*a* is disposed within open ended recess 43 of casing 27, and supporting terminal 97 is mounted against displacement in another opening 99 therefor in base wall 41 of casing 27 by suitable means, such as for instance swedging or the like, thereby to dispose stationary contact 85*a* at least adjacent the base wall for engagement with movable contact 83 on bimetal switch element. Of course, when conductive member 33*a* is disposed in its assembly position, as discussed above, terminal section 37*a* is secured against displacement to extension wall 47 by terminal post 49 in the same manner discussed hereinabove with respect to conductive member 33. To complete the description of alternative overload protector 21*a* and its assembling method, heat generated by resistance heating element 95 in response to current flow therethrough is transferred to bimetal switch element 31** to assist in effecting the discrete snap action movement of the bimetal switching element from the stable configuration to the unstable configuration thereof in the same manner as previously discussed hereinabove.

With further reference in general to FIGS. 1–11, there is provided a method in one form of the invention for assembling starter-protector device 23 adapted to be associated in circuit relation with dynamoelectric machine 25, and since overload protector 21 is an integral component of the combination starter-protector device, the method steps involved in the above discussed method of assembling the overload protector are preliminary to the method steps involved in the method of assembling the combination starter-protector device, as discussed in detail hereinbelow.

Figure 7:
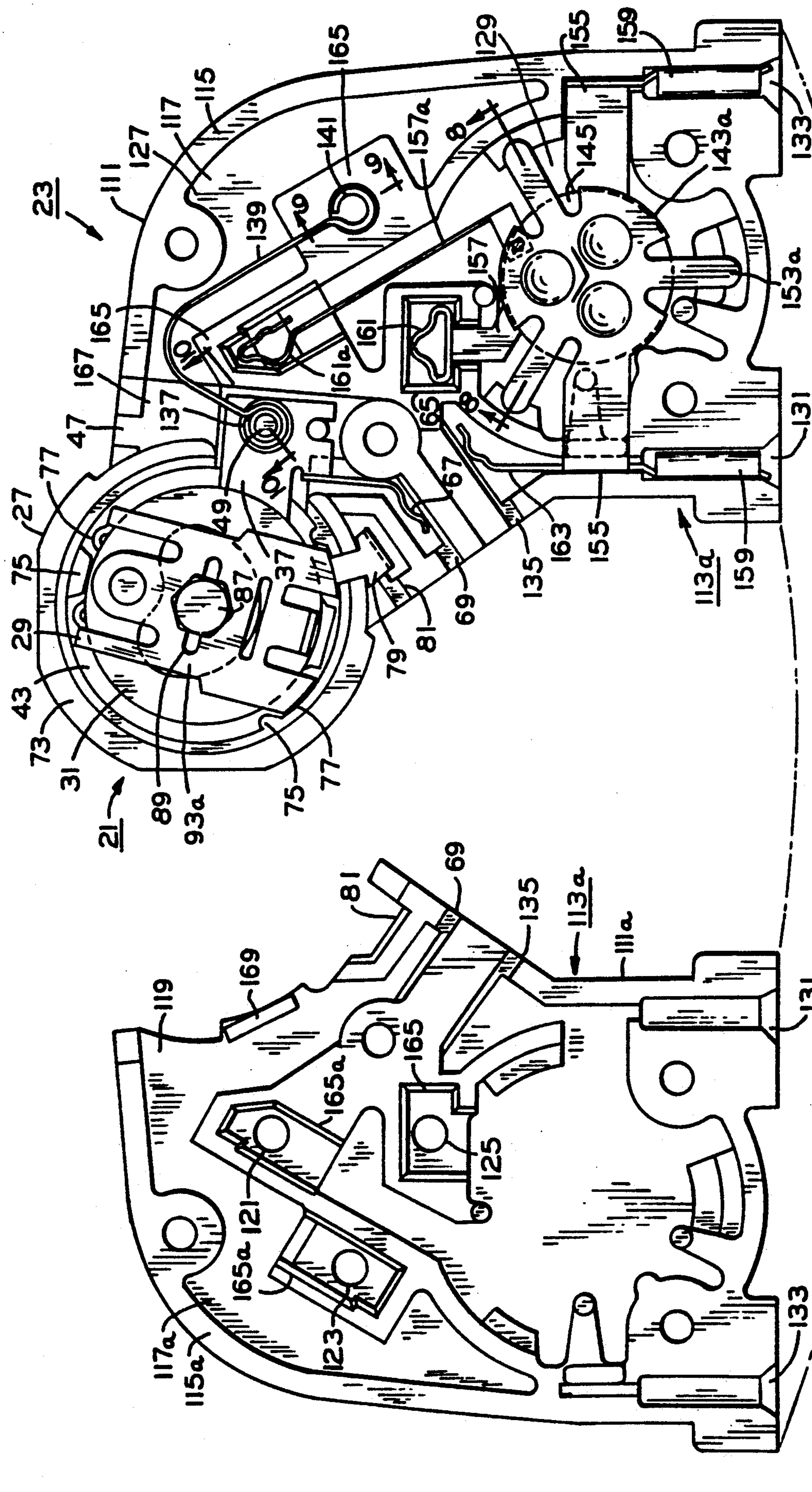
FIG. 7 is a top elevational view of the combination starter-protector device of FIG. 1 with part of the casing removed.
Figure 8:
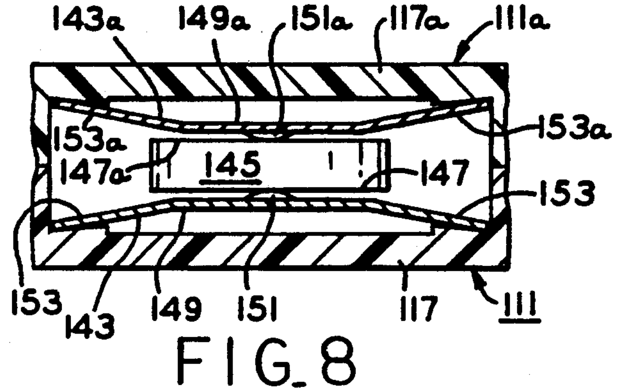
FIGS. 8, 9 and 10 are sectional views taken along lines 8—8, 9—9 and 10—10 in FIG. 7, respectively.
Figure 9:
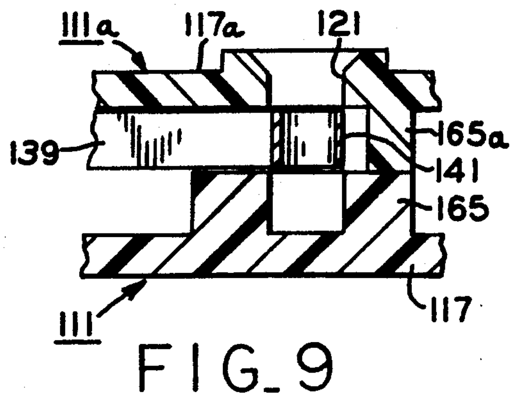
Figure 10:
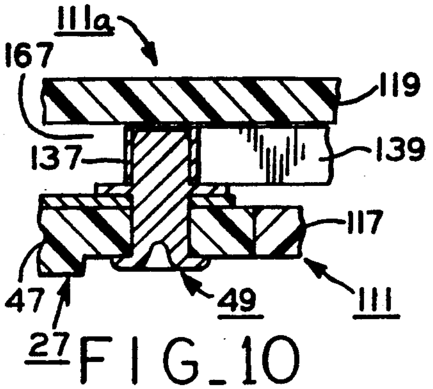

Along with casing 27 of overload protector 21, combination starter-protector device 23 is also provided with a pair of mating casings or casing members **111, 111*a* which may also be formed of a suitable dielectric material, such as a resin or the like for instance, as best seen in FIGS. 1 and 7, and for purposes of brevity of disclosure, like parts of casing 111*a* corresponding to those of casing 111 will be designated by the letter "a". Casings 111, 111*a* are provided with a plurality of walls or wall means, indicated generally at 113, 113*a*, which include marginal walls or sidewalls 115, 115*a* and cross walls 117, 117*a* integrally connected across the marginal walls, respectively. Casing 111a is additionally provided with another extension wall 119 which extends generally laterally beyond marginal wall 115a and a set of Fusite pin receiving apertures 121, 123, 125 which extend in a preselected clustered formation through cross wall 117a**, respectively.

When casings 111, 111a are associated in assembly positions in overlaying and mating engagement with each other, as discussed in greater detail hereinafter, each casing defines in part a channel 127 and a chamber 129 which are separated or isolated from each other and also a set of female terminal receiving openings or slots 131, 133 which intersect or communicate with chamber 129 and marginal walls 115, 115a of the casings, respectively, as best seen in FIGS. 1 and 7. Each casing 111, 111a further defines in part a male terminal receiving opening or slot 135 which intersects or communicates with female terminal receiving slot 131 and marginal walls 115, 115a, and male terminal opening 135 is arranged to be disposed in side-by-side relation with terminal slot 69 in extension wall 47 of casing 27 when casing 27 is arranged in assembly relation with casing 111, as discussed hereinafter.

Subsequent to the above discussed assembly of overload protector 21, casing 27 of the overload protector and casing 111 are arranged at least adjacent each other in assembly positions, as best seen in FIG. 7. With casings 27, 111 in their assembly positions, a female terminal 137 integrally formed on a conductive connection strap 139 is placed or received in circuit relation about terminal end portion 61 of terminal post 49 on casing 27, and the connection strap is moved or pivoted about the terminal post to place another female terminal 141 integrally formed on the connection strap generally opposite female terminal 137 in a preselected position on casing 111. When female terminal 141 is so located in its preselected position, it may be noted that connection strap 139 is disposed or extends in part within the portion of channel 127 defined by casing 111, and female terminal 141 in its preselected position is also located in such channel portion.

Combination starter-protector device 23 also utilizes a pair of means, such as for instance pressure plate 143, 143a or the like, for supporting or embracing a PTCR 145 having a pair of generally opposite contact surfaces 147, 147a. Pressure plates 143, 143a may be formed of any suitable material having the desired electrical and physical properties, such as for instance a stainless steel or the like, and for purposes of brevity of disclosure, like parts of pressure plate 143a corresponding to those of pressure plate 143 are designated by the letter "a". Pressure plates 143, 143a have generally central or contact portions or sections 149, 149a with a set of means, such as for instance nodes 151, 151a or the like, for contacting or engagement in circuit relation with opposite contact surfaces 147, 147a on PTCR 145, respectively. A set of resilient means, such as for instance spring fingers 153, 153a or the like, are integrally formed with central portions 149, 149a and extend generally radially therebeyond, and a pair of arms 155, 157 and 155a, 157a on the central portions extend therebeyond to define female terminals 159, 161 and 159a, 161a, respectively. It may be noted that arm 155a also defines a male terminal 163 extending at least in part generally opposite female terminal 159a.

Subsequent to the above discussed placement of female terminal 141 of connection strap 139 in the preselected position thereof on casing 111, pressure plate 143 may be disposed or positioned in that part of chamber 129 defined in casing 111 with the distal ends of spring fingers 153 respectively engaged with cross wall 117, and female terminal 159 is received in that part of terminal opening 133 defined by casing 111 while female terminal 161 is located in a preselected position therefor at least adjacent cross wall 117. With pressure plate 143 located in an assembly position on casing 111, as discussed above, opposite contact surface 147 on PTCR 145 is placed in contacting engagement with nodes 151 on central portion 149 of pressure plate 143, and pressure plate 143a is then located with respect to casing 111 to place nodes 151a on central portion 149a in contacting engagement with opposite contact surface 147a on the PTCR. Upon the association of pressure plate 143a with PTCR 145, as discussed above, female terminal 159a is received in that part of terminal opening 131 defined by casing 111 while female terminal 161a is located in a preselected position therefor at least adjacent cross wall 117. Further, male terminal 163 on pressure plate 143a is received in that part of male terminal opening 135 defined in casing 111. With pressure plate 143a located in its assembly position on casing 111 and PTCR 145, as discussed above, it may be noted that spring fingers 153a of pressure plate 143a are respectively disposed in opposed overlaying spaced apart relation with spring fingers 153 of pressure plate 143. Furthermore, while arms 157, 157a are illustrated herein as being connected by suitable means, such as for instance spot welding or the like (not shown), to central portions 149, 149a of pressure plates 143, 143a, it is contemplated that such arms 155a, 157a may be integrally formed with central portions 149, 149a within the scope of the invention. While pressure plates 143, 143a and PTCR 145 are discussed above as being assembled onto casing 111 subsequent to the association of connection strap 139 with terminal post 49 and casing 111, it is contemplated that such assembly of the pressure plates and PTCR onto casing 111 may occur prior to the association of the connection strap with the terminal post and casing 111 within the scope of the invention. Furthermore, it is also contemplated that PTCR 145 may be embraced between pressure plates 143, 143a with the assembled together pressure plates and PTCR being thereafter located on casing 111 in the positions discussed hereinabove within the scope of the invention.

Subsequent to the location of pressure plates 143, 143a and PTCR 145 in their respective assembly positions on casing 111, as discussed above, casing 111a is associated or arranged in an assembly position with respect to both casings 27, 111. When casing 111a is located in its assembly position, marginal walls 115a on casing 111a are engaged or mated at least in part with marginal walls 115 on casing 111, and cross walls 117, 117a of casings 111, 111a are disposed in opposed overlaying spaced apart relation with each other, respectively. As previously discussed parts of channel 127, chamber 129, female terminal receiving openings 131, 133 and male terminal receiving slot 135 are defined by both casings 111, 111a, and when casings 111, 111a are located in their assembly positions, channel 127, chamber 129, female terminal openings 131, 133 and male terminal slot 135 are enclosed or formed between casings 111, 111a. Thus, pressure plates 143, 143a with PTCR 145 embraced therebetween are enclosed within chamber 129, and female terminals 159, 159a on the pressure plates are received or disposed within female terminal openings 131, 133 while male terminal 163 on pressure plate 143a is received or disposed within male terminal slot 135. Further, with casings 111, 111a in their assembly positions, it may be noted that channel 127 is separated or isolated from chamber 129, and in their respective preselected positions on casing 111, female terminal 141 of connection strap 139 and female terminals 161, 161a on arms 157, 157a of pressure plates 143, 143a are respectively aligned with apertures 121, 123, 125 in cross wall 117a of casing 111a. Additionally, a plurality of mating sections or parts 165, 165a on casings 111, 111a are entered into capturing or locating relation or engagement with female terminals 141, 161, 161a to retain the female terminals against displacement from their preselected positions in alignment with apertures 121, 123, 125 when casings 111, 111a are in their assembly positions, respectively. It may also be noted that the distal ends of spring fingers 153a on pressure plates 143a are biased into engagement with cross wall 117a of casing 111a urging nodes 151a toward contacting engagement with opposite contact surface 147a of PTCR 145, and in response thereto, opposite contact surface 147 of the PTCR is urged into contacting engagement with nodes 151 of pressure plate 143 against the bias of spring fingers 153 engaged with cross wall 117 of casing 111. Thus, when casings 111, 111a are in their assembled positions, PTCR 145 is biased in contacting engagement between pressure plates 143, 143a in response to the resilient or biasing engagement of spring fingers 153, 153a with cross walls 117, 117a of casings 111, 111a, respectively.

When casing 111a is arranged in its assembly position with respect to both casings 27, 111, as discussed above, extension wall 119 on casing 111a is disposed at least adjacent sidewall 39 of casing 27 and in overlay mating engagement with extension wall 47 of casing 27. With extension walls 47, 119 so disposed in their assembly positions as described above, another chamber 167 is defined between the extension walls and sidewall 39 of casing 27, and it may be noted that chamber 167 communicates with channel 127 while being separated or isolated from chamber 129. Thus, terminal section 37 of conductive member 33 is at least in part enclosed within chamber 167 along with a part of connection strap 139 with its female terminal 137 engaged on terminal post 49, and as previously mentioned, the connection strap also extends in part through channel 127 with female terminal 141 on the connection strap being aligned with aperture 121 in cross wall 117a of casing 111.

Male terminal slots 69, 81 are in part defined by each extension wall 47, 119 so as to be closed or formed when the extension walls are disposed in their assembly positions, and male terminals 67 on conductive member 33 and male terminal 79 on conductive support 29 are respectively positioned in male terminal slots 69, 81 when the extension walls are in their assembly positions. It may also be noted that extension wall 119 has a flange 169 depending therefrom and which is extended at least in part within slot 45 in sidewall 39 of casing 27 thereby to at least in part isolate open ended recess 43 in casing 27 from chamber 167. Upon the closure of male terminal slots 69, 81, as discussed above, it may be noted that male terminal slots 69, 81, 135 are arranged adjacent each other in side-by-side relation with male terminals 67, 79, 163 disposed therein so as to conveniently receive in circuit relation a plug-in multiple connector of a type well known to the art (not shown). To complete the description of the method of assembling combination starter-protector device 23, suitable securing means, such as for instance a plurality of rivets 171 or the like, may be interconnected in displacement preventing engagement between casings 29, 111, 111a thereby to maintain the casings in their assembly positions with respect to each other. While rivets 171 are disclosed herein for maintaining casings 27, 111, 111a against displacement from their assembly positions, it is contemplated that other securing means, such as for instance laser welding of the casings against displacement (not shown), may be utilized within the scope of the invention.

In the light of the foregoing discussion with respect to the method of assembling combination starter-protector device 23, it is believed that such discussion also illustrates the combination starter-protector device per se in one form of the invention.

Figure 11:
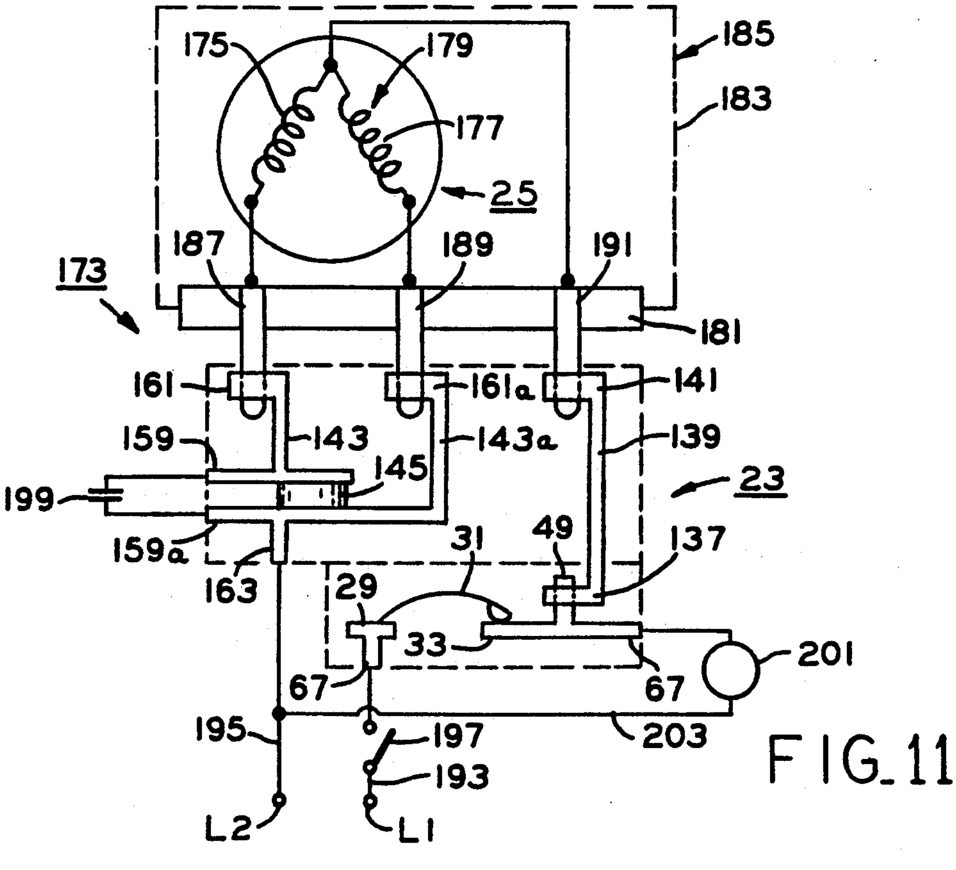
FIG. 11 is a schematic diagram of an exemplary circuit illustrating the combination starter protector device connected in circuit relation with a winding circuit of a dynamoelectric machine arranged within an apparatus housing.

In the exemplary schematic diagram of a circuit 173 in FIG. 11, a start or auxiliary winding 175 and a main or run winding 177 are shown connected in circuit configuration in a winding circuit 179 for dynamoelectric machine 25, and a dielectric plug device 181, such as a Fusite plug or the like for instance, is mounted to a housing or jacket 183 of an apparatus 185, such as a hermetic compressor or the like for instance which may be of the type utilized in refrigeration or air conditioning systems (not shown). Plug device 181 has three pin terminals 187, 189, 191, and pin terminals 187, 189 are respectively connected in circuit relation with start and run windings 175, 177 while pin terminal 191 is connected in circuit relation with both the start and run windings. Combination starter-protector device 23 is mounted in plug-on relation to plug device 181, and female terminals 141, 161, 161a of the combination starter-protector device are releasably received on terminal pins 187, 189, 191 in electrical conductive plug-on or contacting relation therewith to associate the combination starter-protector device in circuit relation with winding circuit 179 of dynamoelectric machine 25. A pair of leads 193, 195 are respectively connected between a pair of power or line terminals L1, L2 and male terminals 67, 163 of combination starter-protector device 23, respectively. A dynamoelectric machine or motor control, such as an on-off switch 197 or the like for instance, may be interposed in lead 193, and if desired, a capacitor 199 may be interconnected in plug-in circuit relation with female terminals 159, 159a on pressure plates 143, 143a of combination starter-protector device 23. To complete the description of exemplary circuit 173, a fan motor 201 utilized in the aforementioned refrigeration or air conditioning systems (not shown) is interposed in a lead 203 interconnected between lead 195 and male terminal 67 on conductive member 33 of combination starter-protector device 23.

In the operation of combination starter-protector device 23 when connected in the exemplary circuit 173, as discussed above, an operator may energize dynamoelectric machine 25 across line terminals L1, L2 by closing switch 197. With switch 197 closed, power is supplied from line terminal L1 through the closed switch, lead 193, male terminal 67 on conductive support 29 of combination starter-protector device 23, its bimetal switch element 31, conductive member 33, terminal post 49 and connection strap 139 to terminal pin 191 of plug device 181. From terminal pin 191 the current flows through both start and run windings 175, 177 of dynamoelectric machine 25 to terminal pins 187, 189 of plug device 181, and the current passing through the start winding flows from terminal pin 187 through pressure plate 143, PTCR 145, pressure plate 143a and male terminal 163 of combination starter-protector device 23 to lead 195 and line terminal L2. At the same time the current passing through run windings 177 of dynamoelectric machine 25 flows from terminal pin 189 of plug device 181 through pressure plate 143a and its male terminal 163 in combination starter-protector device 23 to line 195 and line terminal L2. When capacitor 199 is connected in circuit relation between female terminals 159, 159a of terminal plates 143, 143a in combination starter-protector device 23, the current flowing through start winding 175 also passes through capacitor 199 to enhance the running characteristics of dynamoelectric machine 25, and of course, fan motor 201 is energized across line terminals L1, L2 upon the aforementioned closure of switch 197.

Figure 12:
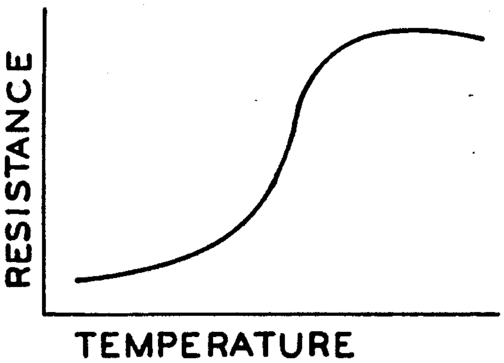
FIG. 12 is an exemplary graphical representation illustrating the relationship of the temperature and resistance characteristics of a PTCR.

As previously mentioned and as graphically illustrated in FIG. 12, PTCR 145 is operable generally in response to current flow therethrough to increase its resistance generally as a function of temperature; therefore, assuming the temperature of the PTCR to be rather low at the beginning of the start-up period of dynamoelectric machine 25 when switch 197 is closed, the PTCR will initially pass current at a value sufficiently great enough to effect a desired starting torque for the dynamoelectric machine during its start-up period. As the temperature of PTCR 145 increases in response to current flow therethrough to the anomaly or transition temperature of the PTCR, its resistance to such current flow also increases to a value which generally renders start winding 175 ineffective in winding circuit 179 of dynamoelectric machine 25 to as to electrically disassociate the start winding from run winding 177. The point of time during the start-up period of dynamoelectric machine 25 at which start winding 175 may be disabled or rendered ineffective, as previously mentioned, may be predetermined so as to generally coincide with the desired running speed of the dynamoelectric machine. PTCR 145 will not act to obviate current flow through start winding 175, but the PTCR will throttle or restrict the passage of such current flow to such a minimal or small value that the start winding is ineffective in winding circuit 179. Of course, when the operator opens switch 197, circuit 173 is interrupted across line terminals L1, L2, and dynamoelectric machine 25 as well as fan motor 201 are deenergized.

As is well known in the art, overload conditions may deleteriously affect components of a dynamoelectric machine, such as for instance shorting or burning-out of the winding circuit thereof, and such overload conditions may be effected by a plurality of different causes or by various combinations of such causes. For instance, some of the well known causes of motor overload conditions are: a running overload; a high temperature overload; an overload occasioned by a stalled or locked rotor; and a high current overload. Irrespective of the particular cause or combination of causes effecting an overload condition, a deleteriously high current is drawn by the dynamoelectric machine, and such high current draw is usually accompanied by or results in a high temperature. Therefore, for the sake of simplifying the discussion of overload conditions herein, it is to be understood that any causes or causes for effecting such an overload condition will be discussed only within the context of a high current draw accompanied by a high temperature condition with respect to winding circuit 179 of dynamoelectric machine 25.

In the event of the occurrence of an overload or high current draw condition in dynamoelectric machine 25, a relatively large amount of current may be drawn in circuit 173 which could deleteriously affect start and run windings 175, 177, as previously mentioned. However, bimetal switch element 31 is responsive to the aforementioned high current and temperature increase to correspondingly increase the heat generated by the bimetal switch element so as to effect the discrete snap action movement of the bimetal switch element from the circuit making position or stable configuration to the circuit breaking position or unstable configuration thereof which disengages movable contact 83 from stationary contact 85 as previously discussed. In this manner, circuit 173 is opened effecting the deenergization of dynamoelectric machine 25 as well as fan motor 201 thereby to isolate or electrically disassociate winding circuit 179 of the dynamoelectric machine 25 and that of fan motor 201 from the current overload which may then exist in the dynamoelectric machine across line terminals L1, L2.

Of course, the above discussed opening of circuit 173 also effects the deenergization and resultant cooling of PTCR 145, and bimetal switch element 31 may cool sufficiently in its circuit breaking position so as to cycle a plurality of times between its circuit breaking and making positions until the high current draw is alleviated. Upon the alleviation of the high current draw, PTCR 145 cools, and its resistance is correspondingly reduced generally as a function of its decreasing temperature. Thus, when the resistance and temperature of PTCR 145 are reduced to a sufficiently low value, the PTCR will again pass current at a value sufficiently great enough to effect the restarting of dynamoelectric machine 25. Therefore, when bimetal switch element 31 also cools enough to cycle or return to its uninterrupted circuit making position, current is drawn through PTCR 145 to again effect the energization of winding circuit 179 in dynamoelectric machine 25 to bring it up to its predetermined running speed, as discussed hereinabove. At the same time, fan motor 201 is also reenergized across line terminals L1, L2. When dynamoelectric machine 25 is so reenergized to attain its running speed, the self-heating effect of PTCR 145 is again effective to reduce current flow therethrough to a value again rendering start winding 175 ineffective in winding circuit 179 of the dynamoelectric machine. Thus, the restarting of dynamoelectric machine 25 assumes that the cause of the overload condition has been alleviated, and if not so alleviated, combination starter-protector device 23 may again operate or function to open circuit 173 taking the dynamoelectric machine as well as fan motor 201 off the line across line terminals L1, L2, as previously described.

When overload protector 21a is utilized in combination starter-protector device 23, the heat generated by resistance heating element 95 is supplemental to that effected by bimetal switching element 31 during the occurrence of an overload condition in dynamoelectric machine 25 to increase the "off-time" of the bimetal switching element, i.e. to increase the length of time the bimetal switching element is cycled into its circuit breaking position.

In view of the foregoing, it is now apparent that a novel combination starter-protector device 23, a novel method of assembling such combination starter-protector device, novel overload protectors 21, 21a and a novel method of assembling such overload protectors have been presented, and it is contemplated that changes as to the precise arrangements, configurations, details and connections of the components of such combination starter-protector device and overload protector and also as to the precise order of the method steps of such assembling methods may be made by those having ordinary skill in the art without departing from the spirit of the invention or from the scope of the invention as illustrated in the claims which follow.

What we claime as new and desire to secure by Letters Patent of the United States is:

1. A combination starter-protection device adapted for connection in circuit relation with a dynamoelectric machine comprising:

a casing including first, second and third casing members associated in assembly positions and interconnected against displacement from the assembly positions, an extension on said first casing member at least adjacent a part of said second casing member and in overlaying engagement with a part of said third casing member, a first chamber defined between said extension, said third casing member part and said second casing member part, an open ended recess in said first casing member isolated at least in part from said first chamber, a pair of slots in said first casing member adjacent said extension and communicating with said open ended recess, a second chamber defined between said second and third casing members and isolated from said first chamber, three apertures in said third casing member with two of said apertures communicating with said second chamber, a channel defined between said second and third casing members so as to be isolated from said second chamber and communicating a third one of said apertures with said first chamber, a pair of female terminal receiving openings defined between said second and third casing members and communicating with said second chamber, a first male terminal receiving opening defined between said second and third casing members and communicating with one of said female terminal receiving openings, and second and third male terminal receiving openings defined between said first and third casing members with said second male terminal receiving opening communicating with said first chamber and said third male terminal receiving opening communicating with one of said slots;

a PTCR having a pair of generally opposite contact surfaces disposed in said second chamber;

a first pressure plate disposed in said second chamber including a first generally central portion having a set of first contact nodes extending therefrom into contacting engagement with one of said opposite contact surfaces on said PTCR, a plurality of first spring fingers extending from said first central portion and biased in seating engagement with said second casing member, and a pair of first arms extending from said first central portion and respectively defining a pair of first female terminals, one of said first female terminals being received in the other of said female terminal receiving openings and the other of said first female terminals being aligned with one of said two apertures;

a second pressure plate disposed in said second chamber including a second generally central portion having a set of second contact nodes extending therefrom into contacting engagement with the other of said contact surfaces on said PTCR, a plurality of second spring fingers extending from said second central portion and biased in seating engagement with said third casing member with said second spring fingers being respectively disposed in spaced apart opposed overlaying relation with said first spring fingers, a pair of second arms extending from said second central portion and respectively defining a pair of second female terminals, one of said second female terminals being received in said one female terminal receiving opening and the other of said second female terminal being aligned with the other of said two apertures, and a first male terminal formed on one of said second arms so as to extend at least in part generally oppositely from said one second female terminal into said first male terminal receiving opening;

an overload protector mounted in an assembly position in said open ended recess and including a conductive support having parts thereof seated against said first casing member within said open ended recess, a bimetal switch element pivotally mounted in circuit relation to said conductive support and movable between circuit making and breaking positions, a second male terminal on said conductive support extending through said one slot into said second male terminal receiving opening, a conductive plate extending through the other of said slots between said open ended recess and said first chamber, said conductive plate having a contact section within said open ended recess arranged to contact in circuit relation said bimetal switch element in its circuit making position and a mounting section within said first chamber seated against said extension, a terminal post connected in circuit relation with said conductive plate within said first chamber and having a part extending through said conductive plate into displacement preventing engagement with said extension, and a third male terminal on said conductive plate extending into said third male terminal receiving opening; and a connection strap disposed within said channel and said first chamber and including a pair of third female terminals, one of said third female terminals being received in circuit relation about said terminal post and the other of said third female terminals being aligned with said third one of said apertures.

2. A combination starter-protector device adapted for connection in circuit relation with a dynamoelectric machine comprising:

a casing including a set of chambers isolated from each other, a channel communicating with one of said chambers, a set of apertures with two of said apertures communicating with another of said chambers and another of said apertures communicating with said channel, a set of first openings respectively communicating with said another chamber, and a set of second openings with one of said second openings communicating with one of said first openings, another of said second openings communicating with said one chamber, and a third one of said second openings disposed adjacent a third one of said chambers;

a PTCR disposed in said another chamber;

a pair of generally opposed pressure plates embracing said PTCR in contacting relation in said another chamber and each pressure plate including a set of resilient means engaged with said casing for effecting the contacting relation of said pressure plates with said PTCR, one of said pressure plates further including a pair of first female terminals with one of said first female terminals being received in another of said first openings and the other of said first female terminals being aligned with one of said two apertures, and the other of said pressure plates further including a pair of second female terminals and a first male terminal extending at least in part generally opposite one of said second female terminals, said one second female terminal and said first male terminal being respectively received in said one first opening and said one second opening and the other of said second female terminals being aligned with the other of said two apertures;

an overload protector disposed at least in part in said third one chamber and including a conductive plate extending between said third one chamber and said one chamber, a second male terminal on said conductive plate and received in said another second opening, and a third male terminal received in said third one of said second openings; and a connection strap disposed within said channel and said one chamber and having a pair of generally opposite ends, one of said opposite ends being connected in circuit relation with said terminal plate and the other of said opposite ends defining a third female terminal aligned with said another aperture.

3. The combination starter-protector device as set forth in claim 2 wherein said PTCR includes a pair of generally opposite contact surfaces, and said pressure plates further include a pair of sets of nodes extending therefrom into engagement with said opposite contact surfaces of said PTCR thereby to effect the contacting relation of said pressure plates with said PTCR, respectively.

4. The combination starter-protector device as set forth in claim 2 wherein said overload protector further includes a terminal post in said one chamber connected in circuit relation with said conductive plate and in mounting relation with said casing, and said one opposite end of said connector strap comprising another third female terminal received about said terminal post thereby to be connected in the circuit relation with said terminal plate.

5. A combination starter-protector device for connection in circuit relation with a dynamoelectric machine comprising:

a casing having a plurality of wall means for defining a set of chambers and a channel in said casing with said channel communicating with one of said chambers;

a set of first terminal openings in one of said wall means with two of said first terminal openings intersecting another of said chambers and a third one of said first terminal openings intersecting said channel;

a set of second terminal openings in another of said wall means intersecting said another chamber;

a set of third terminal openings in said another wall means, one of said third terminal openings intersecting one of said second terminal openings, and another of said third terminal openings intersecting said one wall means generally adjacent a third one of said wall means;

a PTCR having a pair of generally opposite contact surfaces and disposed in said another chamber;

a pair of means for supporting said PTCR in said another chamber, each supporting means including means for engagement in circuit relation with a respective one of said opposite contact surfaces, a set of resilient means engaged with said casing within said another chamber for urging a respective one of said engagement means into the circuit relation with said respective one of said opposite contact surfaces, a set of first female terminals, one of said first female terminals on each supporting means being respectively disposed in said second terminal openings and another of said first female terminals on each supporting means being respectively aligned with said one of said two first terminal openings and said third one of said first terminal openings, and a first male terminal extending from said one first female terminal on one of said supporting means and received in said one third terminal opening;

an overload protector disposed at least in part in a third one of said chambers and including a conductive support seated against said casing within said third one chamber, a second male terminal on said support extending through said third one of said wall means and received in said another third terminal opening, and conductive means for extension through said third one of said wall means between said third one chamber and said one chamber; and means disposed in both said channel and said one chamber for connection in circuit relation with said conductive means and including a third female terminal aligned with the other of said two first terminal openings.

6. The combination starter-protector device as set forth in claim 5 wherein said engagement means includes a set of nodes extending from said supporting means for engagement with said opposite contact surfaces of said PTCR, respectively.

7. The combination starter-protector device as set forth in claim 5 wherein each resilient means comprises a set of spring fingers each having a distal end portion against said casing within said another chamber thereby to urge the respective one of said connection means into the circuit relation with the respective one of said one opposite contact surfaces, said spring fingers on said supporting means being arranged in spaced apart overlaying relation, respectively.

8. The combination stater-protector device as set forth in claim 5 wherein said conductive means includes a terminal post within said one chamber and arranged in mounting relation with said casing, and said connection means comprising a lead strap defining said third female terminal and including another third female terminal received in circuit relation on said terminal post.

9. The combination starter-protector device as set forth in claim 8 wherein said overload protector further includes bimetal switch means connected in circuit relation with said second male terminal and operable generally for switching between an at-rest position disposed in circuit making relation with said conductive means and another position disengaged therefrom.

10. The combination-starter protector device as set forth in claim 5 wherein said overload protector further includes a third male terminal on said conductive means and received in said another third terminal opening.

11. The combination-starter protector device as set forth in claim 5 wherein said conductive means includes a contact section disposed at least in part in said third one chamber and a mounting section disposed at least in part in said one chamber, bimetal switch means pivotally mounted in circuit relation with said conductive support and operable generally for switching between one position disposed in circuit making relation with said contact section and another position disengaged therefrom, and a terminal post connected in circuit relation with said mounting section and in mounting relation with a part of said casing adjacent said one chamber, said connection means further including another third female terminal received on said terminal post.

12. The combination starter-protector device as set forth in claim 11 wherein said contact section inlcudes a contact supported in said third one chamber so as to engage in circuit relation said bimetal switch means when said bimetal switch means is in its one position, and heater means connected in circuit relation between said contact and said mounting section.

13. A method of assembling an overload protector for use in a combination starter-protector device adapted to be associated in circuit relation with a dynamoelectric machine, the overload protector having a conductive support with a first aperture therein, a male terminal and a bimetal switch element connected in circuit relation with the conductive support, an adjusting screw, a conductive member having a contact section and a terminal section with a first mounting opening through the terminal section, a terminal post having a flange interposed between a female terminal receiving end portion and a mounting end portion opposite thereto, and a casing member including an open ended recess defined by a generally cylindric sidewall integral with a base wall with the base wall having a second aperture therethrough and with a plurality of seating surfaces on the sidewall within the open ended recess, another wall extending generally laterally from a part of the sidewall with a second mounting opening through the another wall and at least one terminal opening formed at least in part in the another wall, and a pair of spaced apart slots extending through the sidewall adjacent the another wall, the method comprising the steps of:

inserting at least the terminal section of the conductive member through one of the slots in the sidewall and locating the contact section and the terminal section of the conductive member at least adjacent the base wall and the another wall, respectively;

aligning the first mounting opening in the terminal section with the second mounting opening in the another wall during the locating step;

passing the mounting end portion on the terminal post through the aligned first and second mounting openings generally toward the another wall and extending the female terminal receiving portion of the terminal post generally perpendicularly from the terminal section;

engaging the flange on the terminal post in circuit relation with the terminal section generally about the first mounting opening therein in response to the passing step and deforming a distal end of the mounting end portion into displacement preventing engagement with the another wall generally about the second mounting opening therein;

entering the conductive support into the open ended recess and seating parts of the conductive support against the seating surfaces on the sidewall in the open ended recess;

passing the male terminal on the conductive support through the other of the slots in the sidewall at least during the entering step and positioning the male terminal at least in part in the at least one terminal opening in the another wall at least when the conductive support parts are seated against the seating surfaces;

biasing the bimetal switch element on the conductive support into contacting engagement in circuit relation with the contact section of the conductive member at least when the conductive support parts are seated against the seating surfaces;

extending the adjusting screw through the first aperture in the conductive support and threadedly engaging the adjusting screw with the second aperture in the base wall; and urging a part of the adjusting screw into adjusting engagement with the conductive support to exert an adjusting force thereon during the threadedly engaging step and transferring the adjusting force through the conductive support to the bimetal switch element to adjust the bias thereof into the contacting engagement with the contact section of the conductive member.

14. The method as set forth in claim 13 wherein the contact section includes a stationary contact and a resistance heating element with the resistance heating element being interconnected in circuit relation between the stationary contact and the terminal section and wherein the locating step includes mounting the stationary contact and the resistance heating element in the open ended recess at least adjacent the base wall, the bimetal switch element being biased in the contacting engagement with the stationary contact during the biasing step.

15. A method of assembling an overload protector for use in a combination-starter protector device adapted to be associated in circuit relation with a dynamoelectric machine, the overload protector having a conductive support with a male terminal and a bimetal switch element thereon, a conductive member having a contact section and a terminal section, a terminal post, and a casing member including a sidewall integral with a base wall, a wall extension disposed beyond the sidewall and having at least one terminal slot formed at least in part therein and a pair of slots in the sidewall, the method comprising the steps of:

inserting at least the terminal section of the conductive member through one of the slots in the sidewall of the casing member and locating the contact section and the terminal section of the conductive member in assembly positions at least adjacent the base wall and the wall extension of the casing member;

interconnecting the terminal post with the terminal section and the extension wall and retaining at least the terminal section against displacement from its assembly position in response to the interconnecting step;

mounting the conductive support of the overload protector at least in part within the sidewall and biasing a part of the bimetal switch element into contacting circuit relation with the contact section; and passing the male terminal on the conductive support through the other of the slots in the sidewall and positioning the male terminal at least in part within the at least one terminal slot in the wall extension in response to the mounting step.

16. The method as set forth in claim 15 wherein the casing member further includes a first mounting opening in said wall extension, the conductive member also having a second mounting opening through the terminal section, and wherein the disposing step includes aligning the first and second mounting openings with each other.

17. The method as set forth in claim 16 wherein the terminal post includes a flange and wherein the interconnecting step includes passing a part of the terminal post through the aligned first and second mounting openings thereby to engage the flange with the terminal section at least adjacent the second mounting opening and deforming a distal end of the terminal post part into displacement preventing engagement with a part of the extension wall at least adjacent the first mounting opening.

18. The method as set forth in claim 15 wherein the wall extension also has at least another terminal opening formed at least in part therein, and wherein the conductive member also has another male terminal on the terminal section thereof, and wherein the disposing step includes positioning the another male terminal at least in part within the at least another terminal opening in the extension wall.

19. The method as set forth in claim 15 wherein the conductive member further has at least one yieldable section and wherein the method further comprises the additional steps of applying an adjusting force onto the conductive plate to yield the yieldable section and adjusting thereby the bias of the bimetal switch element part into the contacting circuit relation with the contact section.

20. The method as set forth in claim 15 wherein the contact section includes a contact and a resistance heating element with the resistance heating element being interconnected in circuit relation between the contact and the mounting section and wherein the locating step includes supporting the contact and resistance heating element within the sidewall at least adjacent the base wall, the bimetal switch part being biased into the contacting circuit relation with the contact during the biasing step.

21. A method of assembling an overload protector for use in a starter-protector device adapted to be associated in circuit relation with a dynamoelectric machine, the overload protector having a conductive support with a bimetal switch element secured thereto, a conductive member having a contact section and a terminal section, and a casing including a sidewall and a base wall defining an open ended recess in the casing, at least one slot in the sidewall intersecting the open ended recess, and an extension wall extending from the sidewall, the method comprising the steps of:

extending the conductive member through the at least one slot and locating the contact section within the open ended recess at least adjacent the base wall and the terminal section on the extension wall;

securing the terminal section against displacement to the extension wall; and disposing the conductive support in an assembly position at least in part within the open ended recess and engaging the bimetal switch element in circuit relation with the contact section.

22. The method as set forth in claim 21 wherein the casing further includes another slot in the sidewall intersecting the open ended recess, and the conductive support further having a male terminal thereon, and wherein the disposing step includes passing the male terminal into the another slot and positioning the male terminal at least in part exteriorly of the open ended recess.

23. The method as set forth in claim 21 wherein the overload protector further has a terminal post and wherein the securing step includes seating a part of the terminal post in circuit relation with the terminal section and deforming another part of the terminal post into displacement preventing engagement with the extension wall.

24. The method as set forth in claim 23 wherein the terminal section and the extension wall each have a mounting opening therethrough and wherein the locating step includes aligning the mounting opening in the terminal section with the mounting opening in the extension wall, the first named part of the terminal post being seated against the terminal section generally about the mounting opening therein in response to the seating step and the deformed another part of the terminal post being engaged with the extension wall generally about the mounting opening therein in response to the deforming step.

25. The method as set forth in claim 21 wherein the contact section includes another contact and a resistance heating element with the resistance heating element being connected in circuit relation between the another contact and the terminal section and wherein the locating step includes supporting the another contact within the open ended recess at least adjacent the base wall, the first named contact on the bimetal switch element being engaged in the circuit relation with the another contact during the engaging step.

26. A method of assembling a starter-protector device adapted to be associated in circuit relation with a dynamolelectric machine, the starter-protector device having a connection strap defining a pair of female terminals, a conductive member having a contact section and a terminal section, a terminal post, an overload protector including a conductive support, and a bimetal switch element pivotally mounted in circuit relation with the conductive support, and a set of casing members, one of the casing members including a sidewall and a base wall defining an open ended recess, and another wall extending generally laterally beyond a part of the sidewall, another of the casing member including at least one aperture therein, and another extension wall on the another casing member extending therebeyond, and at least a third casing member, the method comprising the steps of:

locating the contact section of the conductive member within the open ended recess in the one casing member and the terminal section of the conductive member on the first named extension wall of the one casing member;

interconnecting the terminal post with the first named extension wall and the terminal section and retaining at least the mounting section against displacement in response to the interconnecting step;

mounting the conductive support of the overload protector at least in part within the open ended recess against displacement therefrom and biasing the bimetal switch element into contacting engagement in circuit relation with the contact section;

receiving one of the female terminals on the connection strap in circuit relation about the terminal post;

arranging the one casing member and the at least third casing member at least adjacent each other in assembly positions, respectively, and pivoting the connection strap about the terminal post to place the other of the female terminals on the connection strap in a preselected position on the at least third casing member when the one and at least third casing members are in their assembly positions;

placing the another casing member in an assembly position at least in part in overlaying engagement with the at least third casing member and positioning the another wall on the another casing member at least adjacent the sidewall on the one casing member and at least in part in overlaying engagement with the first named extension wall in response to the placing step;

aligning the at least one aperture in the another casing with the other female terminal in its preselected position in response to the placing step and enclosing the connection strap within the casing members when the casing members are in their assembly positions; and securing the casing members in their assembly positions against displacement from each other.

27. The method as set forth in claim 26 wherein the contact section of the conductive member comprises a stationary contact and a resistance heating element and wherein the locating step includes disposing the stationary contact and the resistance heating element within the open ended recess at least adjacent the base wall and interconnecting the resistance heating element in circuit relation between the stationary contact and the mounting section, the bimetal switch element being biased into the contacting engagement in the circuit relation with the stationary contact during the biasing step.

28. The method as set forth in claim 26 wherein the placing step includes forming a chamber and a channel isolated therefrom between the another casing member and the at least third casing member with the other female terminal and a part of the connection strap being enclosed in the channel in response to the enclosing step.

29. The method as set forth in claim 28 wherein the positioning step includes defining another chamber between the casing members and in communication with the channel when the casing members are in their assembly positions and with at least the one female terminal and another part of the connection strap being enclosed in the another chamber in response to the enclosing step.

30. The method as set forth in claim 28 wherein the starter-protector device also has a PTCR and a pair of pressure plates and wherein the method further comprises the intermediate step of disposing the pressure plates with the PTCR embraced in contacting engagement therebetween in a preselected position on the at least third casing member so as to be enclosed at least in part in the chamber upon the occurrence of the enclosing step.

31. An overload protector for use in a combination starter-protector device adapted to be associated in circuit relation with a dynamoelectric machine, the overload protector comprising:

a casing including a generally cylindric sidewall having a free marginal edge on one end thereof and a base wall integral with said sidewall at the other end thereof, said sidewall and base wall defining an open ended recess in said casing, a plurality of seating surfaces integral with said casing within said open ended recess, an another wall extending generally laterally beyond a part of said sidewall, a first mounting opening through said another wall, an abutment surface on said another wall, at least one terminal opening formed at least in part in said another wall, and a pair of spaced apart slots extending through said sidewall adjacent said another wall and intersecting said free marginal edge, respectively;

a conductive member extending through one of said slots and including a contact section disposed at least adjacent said base wall within said open ended recess, a terminal section seated against said another wall, a side edge portion on said terminal section disposed in abutment with said abutment surface, and a second mounting opening extending through said terminal section and disposed in alignment with said first mounting opening;

a terminal post associated in circuit relation with said terminal section and including a female terminal receiving portion extending from said terminal section, a flange engaged in circuit realtion with said terminal section generally about said second mounting opening therein, and a mounting portion extending through said first and second mounting openings and deformed into displacement preventing engagement with said anotehr wall generally about said first mounting opening therein;

a conductive support disposed at least in part within said open ended recess in displacement preventive engagement with said seating surfaces, said conductive support including a bimetal switch element pivotally connected in circuit relation to said conductive support and operable generally between an at-rest position urged into circuit making engagement with said contact section of said conductive member and a circuit breaking position displaced from said contact section, and a male terminal connected in circuit relation with said conductive support and extending through the other of said slots in said sidewall into said at least one terminal opening in said another wall.

32. An overload protector for use in a combination starter-protector device adapted to be associated in circuit relation with a dynamoelectric machine, the overload protector comprising:

a casing including a sidewall and a base wall defining an open ended recess in said casing, at least one slot in said sidewall intersecting said open ended recess, and another wall extending beyond the sidewall exteriorly of the open ended recess;

a conductive member extending through the at least one slot and including a contact section disposed in said open ended recess at least adjacent said base wall, and a terminal section seated at least in part on said another wall;

means for securing said terminal section against displacement from said another wall;

bimetal switch means disposed within said open ended recess and operable generally for switching between one position engaged in circuit relation with said contact section and another position displaced from said contact section; and conductive means disposed at least in part within said open ended recess for supporting said bimetal switch means.

33. The overload protector as set forth in claim 32 wherein said contact section includes a contact, and resistance heating means for interconnection in circuit relation between said contact and said terminal section, said bimetal switch means in its one position being engaged in the circuit relation with said contact.

34. The overload protector as set forth in claim 32 wherein said casing further includes a mounting opening in said another wall, said conductive member further including another mounting opening in said terminal section and aligned with said first named mounting opening, and said securing means including a part engaged with said terminal section generally about the first named mounting opening and another part deformed into displacement preventing engagement with said another wall generally about said another mounting opening.

35. The overload protector as set forth in claim 34 wherein said securing means comprises a terminal post having a female terminal receiving portion extending from said terminal section, a mounting portion extending through said first named and another mounting openings and deformed into the displacement preventing engagement with said another wall, said mounting portion comprising said another part of said securing means, and a flange interposed between said female terminal receiving portion and said mounting portion and engaged with said terminal section, said flange comprising said first named part of said securing means.

36. The overload protector as set forth in claim 32 wherein said casing further includes at least another slot in said sidewall intersecting said open ended recess and spaced from said at least one slot, and said conductive means including a male terminal extending therefrom through said at least another slot exteriorly of said open ended recess.

* * * * *